United States Patent
Brocious et al.

(10) Patent No.: US 10,586,033 B2
(45) Date of Patent: *Mar. 10, 2020

(54) AUTOMATIC UPGRADE FROM ONE STEP AUTHENTICATION TO TWO STEP AUTHENTICATION VIA APPLICATION PROGRAMMING INTERFACE

(71) Applicant: International Business Machines Corporation, Armonk, NY (US)

(72) Inventors: Larry A. Brocious, Apalachin, NY (US); Michael J. Howland, Endicott, NY (US); Paul E. Rogers, Johnson City, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 171 days.

This patent is subject to a terminal disclaimer.

(21) Appl. No.: 15/689,073

(22) Filed: Aug. 29, 2017

(65) Prior Publication Data

US 2019/0065730 A1 Feb. 28, 2019

(51) Int. Cl.
*G06F 21/00* (2013.01)
*G06F 21/40* (2013.01)
(Continued)

(52) U.S. Cl.
CPC ............. *G06F 21/40* (2013.01); *G06F 21/31* (2013.01); *H04L 9/0838* (2013.01);
(Continued)

(58) Field of Classification Search
CPC ..... G06F 21/40; G06F 21/31; H04L 63/0892; H04L 63/0838; H04L 9/0863;
(Continued)

(56) References Cited

U.S. PATENT DOCUMENTS 7,743,409 B2 * 6/2010 Gonzalez ................ G06F 21/31
713/184
8,312,519 B1 * 11/2012 Bailey ..................... H04L 9/003
380/255

(Continued)

FOREIGN PATENT DOCUMENTS

| CN | 104168329 A | 8/2014 |
| CN | 104468119 A | 11/2014 |

(Continued)

OTHER PUBLICATIONS

Appendix P, 2017.

(Continued)

*Primary Examiner* — Mahfuzur Rahman
(74) *Attorney, Agent, or Firm* — Garg Law Firm, PLLC; Rakesh Garg; Edward Wixted (57) ABSTRACT

A client transmits a user identifier and a password to a server via an application programming interface (API). The client establishes an authenticated session with the server in which the client has a first set of permissions for operations associated with the API. The client receives, responsive to a verification of the user identifier and password by the server, a logon response and a shared secret. The client generates a one time passcode (OTP) based upon the shared secret. The client sends the OTP to the server via the API. Responsive to the server validating the OTP against the shared secret, the server grants a second set of permissions for operations associated with the API.

16 Claims, 6 Drawing Sheets

(51) Int. Cl.
*H04L 9/32* (2006.01)
*H04L 9/08* (2006.01)
*H04L 29/06* (2006.01)
*G06F 21/31* (2013.01)

(52) U.S. Cl.
CPC .......... *H04L 9/0863* (2013.01); *H04L 9/3228* (2013.01); *H04L 63/0838* (2013.01); *H04L 63/0892* (2013.01); *H04L 63/205* (2013.01); *H04L 2463/082* (2013.01)

(58) Field of Classification Search
CPC ............. H04L 9/3228; H04L 2463/082; H04L 9/0838; H04L 63/205
See application file for complete search history.

(56) References Cited

U.S. PATENT DOCUMENTS

| | | | | |
|---|---|---|---|---|
| 2006/0083228 A1* | 4/2006 | Ong | ................. | G06F 21/34 370/389 |
| 2008/0010451 A1* | 1/2008 | Holtzman | ............ | H04L 9/3228 713/158 |
| 2008/0010685 A1* | 1/2008 | Holtzman | ........... | G06F 12/1483 726/27 |
| 2008/0168544 A1* | 7/2008 | von Krogh | ............. | G06F 21/34 726/6 |
| 2010/0138652 A1* | 6/2010 | Sela | ..................... | G06F 21/445 713/158 |
| 2011/0078773 A1* | 3/2011 | Bhasin | ................ | H04L 63/0838 726/5 |
| 2012/0233668 A1* | 9/2012 | Leafe | .................. | G06F 9/44526 726/4 |
| 2014/0149492 A1 | 5/2014 | Ananthanarayanan et al. | | |
| 2015/0111539 A1* | 4/2015 | Shim | ................... | H04L 12/2803 455/411 |
| 2015/0244699 A1* | 8/2015 | Hessler | ................... | G06F 21/44 726/7 |
| 2017/0083386 A1 | 3/2017 | Wing et al. | | |
| 2017/0346851 A1* | 11/2017 | Drake | ................. | H04L 63/1466 |
| 2018/0041510 A1* | 2/2018 | Burch | ..................... | H04L 63/08 |
| 2018/0191501 A1* | 7/2018 | Lindemann | ........... | H04L 9/3231 |

FOREIGN PATENT DOCUMENTS

| | | |
|---|---|---|
| CN | 105357186 A | 10/2015 |
| CN | 106304074 A | 8/2016 |

OTHER PUBLICATIONS

PCT, International Searching Authority, PCT/IB2018/056437, dated Jan. 4, 2019.
Sudhakar, "Techniques for Securing REST." CA Technology Exchange (2011): 32. (Background).
Malisetti, "Securing RESTful Services with Token-Based Authentication" CA Technology Exchange (2011): 43. (Related).
Lee, "Secure and Stateless RESTful Web Service Using ID-Based Encryption.", available from researchgate.net, datE not available (Background).
Marinescu et al. "IVD: Automatic Learning and Enforcement of Authorization Rules in Online Social Networks." Security and Privacy (SP), 2017 IEEE Symposium on. IEEE, 2017. (Background).
Abdulla et al., "Identify Cloud Security Weakness related to Authentication and Identity Management (IAM) using Openstack keystone Model." Academic Fora, Full Paper Proceeding ECBA—2017, vol. 03—Issue 42, 1-5 (2017). (Related).
Gusmeroli et al., "A capability-based security approach to manage access control in the Internet of Things", in Mathematical and Computer Modelling, Elsevier, (2013) (Background).
Richer, User Authentication with OAuth 2.0, https://oauth.net/articles/authentication/, 2017.

\* cited by examiner

AUTOMATIC UPGRADE FROM ONE STEP AUTHENTICATION TO TWO STEP AUTHENTICATION VIA APPLICATION PROGRAMMING INTERFACE

TECHNICAL FIELD

The present invention relates generally to a system, and computer program product for two step authentication. More particularly, the present invention relates to a system, and computer program product for automatic upgrade from one step authentication to two step authentication via an application programming interface.

BACKGROUND

Currently, network application security is being augmented from the standard procedure of a user providing a user identifier (ID) and password in order to authenticate with a network service or application to further requiring a two step authentication process. In addition to requiring a user to provide a first authentication factor, such as a user ID and password, two step authentication requires the user to provide a second authentication factor in order to complete an authentication process. Typically, the second authentication factor is information known to the user that is unlikely to be known by an unauthorized user such as a secret known to the user or a security token.

SUMMARY

The illustrative embodiments provide a system, and computer program product. An embodiment includes transmitting, by a client, a user identifier and a password to a server via an application programming interface (API). The embodiment further includes establishing an authenticated session with the server in which the client has a first set of permissions for operations associated with the API. The embodiment further includes receiving, responsive to a verification of the user identifier and password by the server, a logon response and a shared secret. The embodiment further includes generating, by the client, a one time passcode (OTP) based upon the shared secret. The embodiment further includes sending the OTP to the server via the API. The embodiment still further includes granting, responsive to the server validating the OTP against the shared secret, a second set of permissions for operations associated with the API.

An embodiment further includes receiving, by the client device, the user identifier and password, from a user. In an embodiment, the receiving of the logon response and shared secret is responsive to a determination that a user associated with the user identifier is designated for upgrading from one factor authentication to two factor authentication.

An embodiment further includes storing, by the client, the shared secret within client preferences associated with a user. In an embodiment, the server is configured to store the shared secret within a user profile associated with a user. In an embodiment, the API includes a Representational state transfer (REST) API. In an embodiment, the second set of permissions is greater than the first set of permissions.

An embodiment further includes transmitting the user ID, the password, and a current OTP generated based upon the shared secret to the server in a subsequent logon operation.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Various illustrative embodiments provide for automatic upgrade from one step to two step authentication for server applications or services that utilize a stateless protocol application programming interface (API). A stateless protocol does not require either the sender or receiver to retain session information during the life of a communication session. One or more embodiments provide for automatic upgrade from one step to two step authentication for server applications or services that utilize a Representational state transfer (REST) API completely in-band without requiring additional steps outside of the REST API work area. Two step authentication is sometimes referred to as two factor authentication. In particular embodiments, one step authentication utilizing only a user ID and password for authentication is automatically upgraded for a particular user to two step authentication utilizing a user ID/password as well as a one time passcode for authentication.

In a traditional use case for two factor authentication, a user logs on to a web application via a browser, enters a user ID and password, and enables two factor authentication within a user profile associated with the user. The user then captures a shared secret with a smartphone or other device, commonly by scanning a QR code. The user generates a passcode based on the shared secret and submits the passcode to an authenticating server for validation. In existing implementations, a user is required to set up the second factor in a traditional manner by logging on via a web browser, and a separate authentication token, not the same shared secret and algorithm, is used for web access compared to API access.

One or more particular embodiments described herein allows users that interact with a web application via REST APIs to leverage the same set of features that are available to a traditional web browser, that is enabling two step authentication for their user accounts, as authentication via a REST API client.

In an embodiment, a particular user is designated as requiring an upgrade from one factor authentication to two factor authentication in order to grant access to one or more applications or services at a next logon attempt. In a particular embodiment, the user is designated as requiring two factor authentication by an administrator of an application or service. In the embodiment, a user logs on to a server, such as an authentication server, by providing a user ID and password using a web services (REST API) client application. In the embodiment, the server attempts to verify the user using the user ID and password.

Upon successfully authentication, a session, such as a web services session, is established between the server and client in which the user is in a limited logged on state. In the limited logged on state, the user is authenticated but only has permission to access a limited set of API operations. In the embodiment, the server generates a shared secret and stores the shared secret within the session. In one or more embodiments, the shared secret is information known only to the client and server which is created using a key-agreement protocol such as a public key encryption. In particular embodiments, the shared secret is a password, passphrase or pseudo-randomly generated number or string. In the embodiment, the server sends a logged on response back to the client containing session-specific data and the shared secret.

In the embodiment, the client application generates a one time passcode (OTP) based upon the shared secret. In a particular embodiment, the OTP is generated from the shared secret using a time-based one time passcode (TOTP) algorithm such as described in M'Raihi, D., Machani, S., Pei, M., Rydell, J., "TOTP: Time-Based One-Time Password Algorithm", Request for Comments (RFC) 6238, Internet Engineering Task Force (IETF), May 2011. In one or more embodiments, the server combines the shared secret with a current timestamp using a cryptographic hash function to generate the one time passcode. In the embodiment, the client sends an API request to the server including the OTP requesting setting of the shared secret into a user profile associated with the user.

Responsive to receiving the OTP, the server validates that OTP against the shared secret. If validation is successful, the server stores the shared secret within the user profile and sends a successful response back to the client. In the embodiment, the client application stores the shared secret into REST API client preferences or another database. In the embodiment, subsequent logons from the user require the user to submit the user ID, password, and a current OTP based on the shared secret in order to be authenticated with the server to gain access to applications and services provided by the server.

The illustrative embodiments are described with respect to certain types of services, transmissions, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
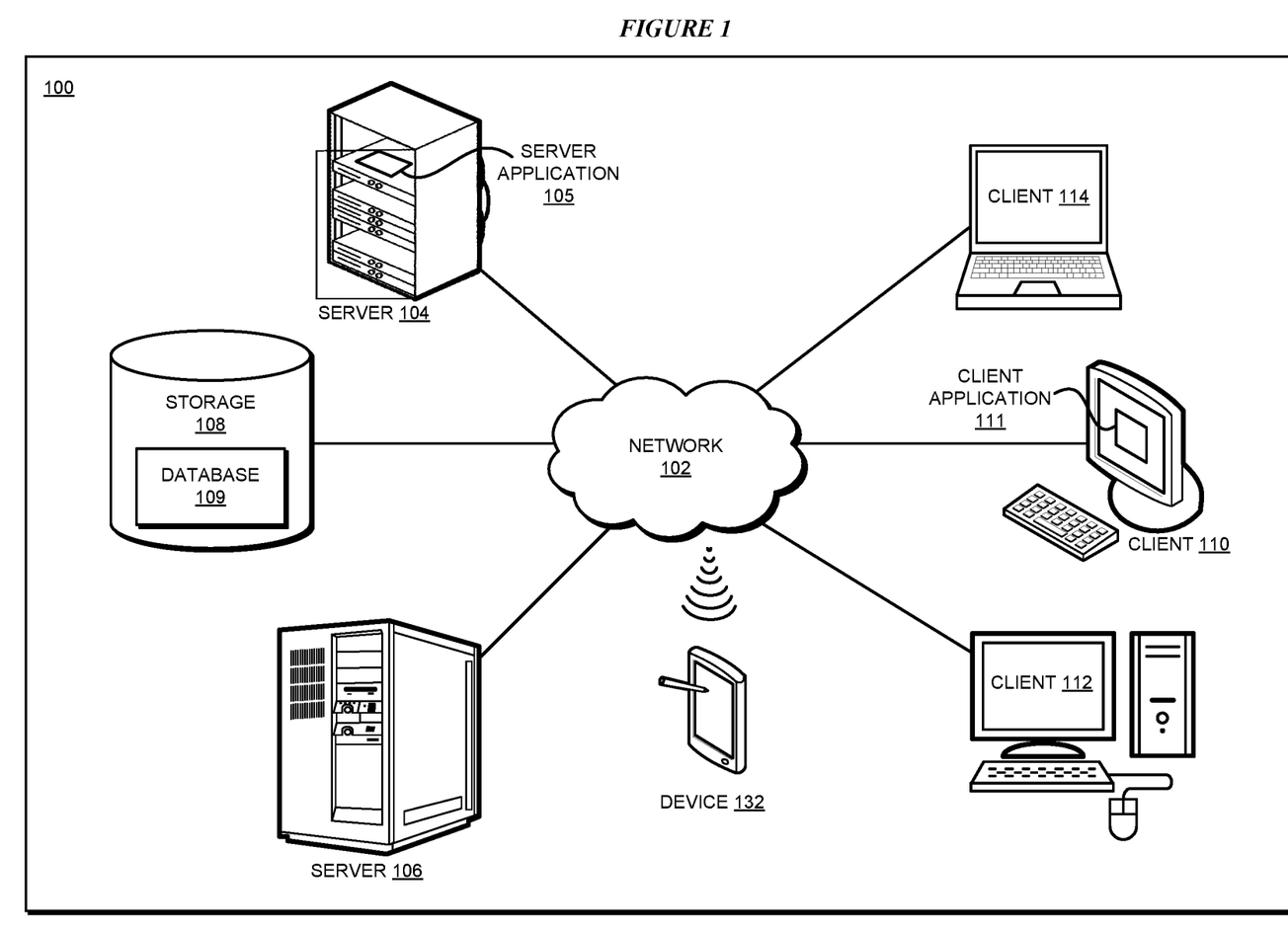
FIG. 1 depicts a block diagram of a network of data processing systems in which illustrative embodiments may be implemented.
Figure 2:
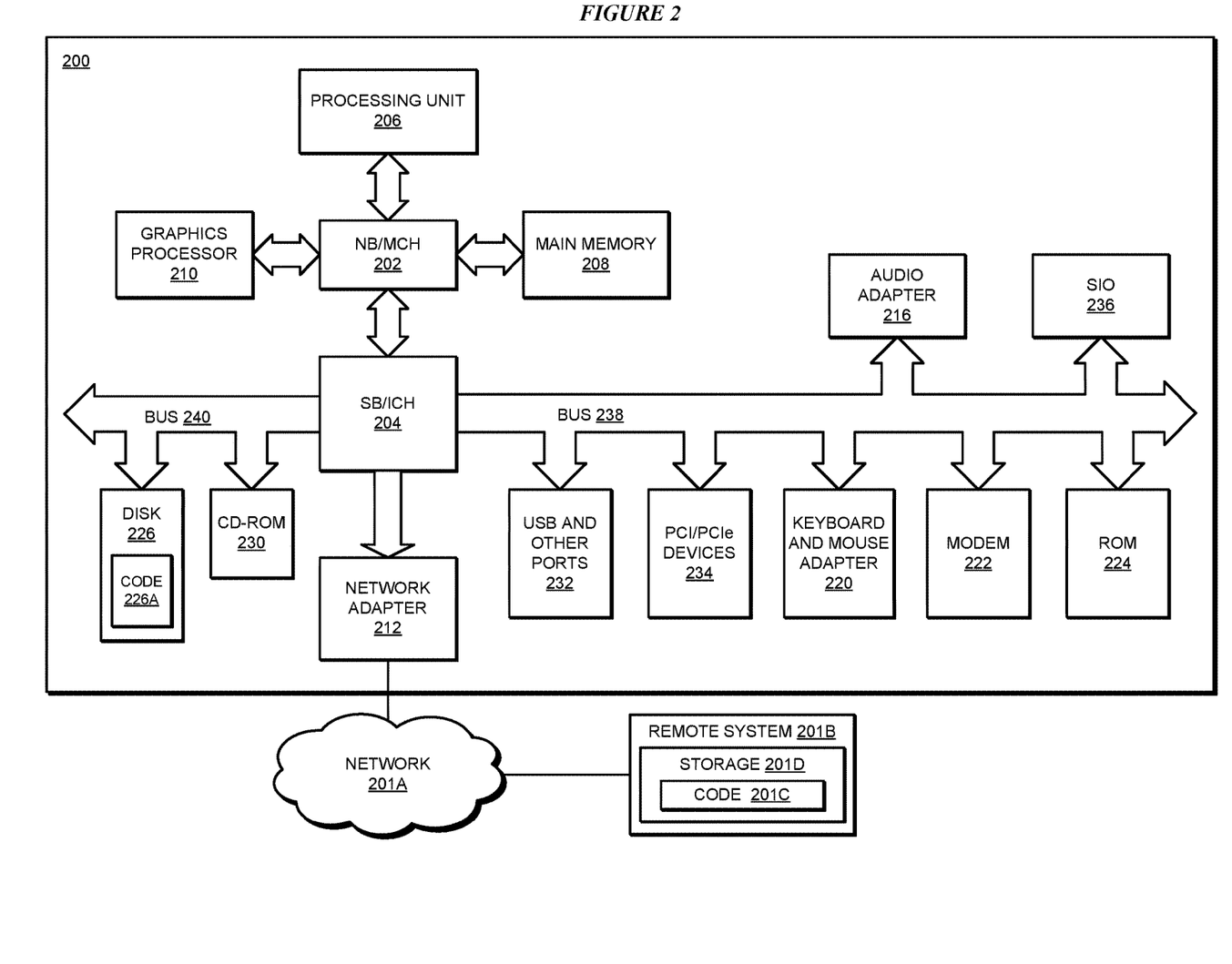
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Server application 105 of server 104 implements an embodiment of server side authentication operations described herein. Database 109 may be stored in storage 108 as shown or supplied by another source (not shown). In particular embodiments, database 109 may store user profile information associated with one or more users. Client application 111 implements an embodiment of client side authentication operations described herein.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as device 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro- SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as server application 105 or client application 111 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
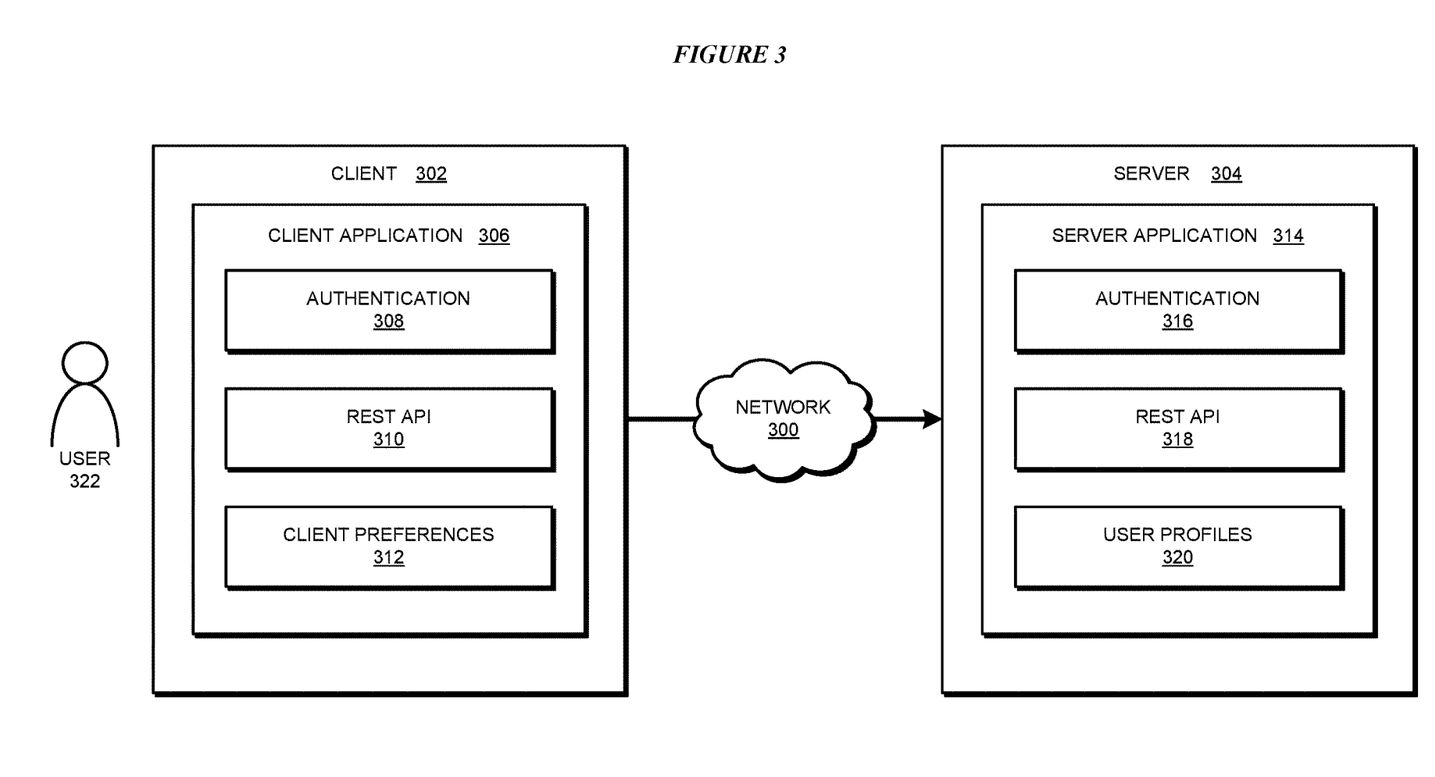
FIG. 3 depicts a block diagram of an example configuration for automatic upgrade of two step authentication in accordance with an illustrative embodiment.

With reference to FIG. 3, this figure depicts a block diagram of an example configuration for automatic upgrade of two step authentication in accordance with an illustrative embodiment. Client 302 is an example of client 110 in FIG. 1, and client application 306 is an example of client application 111 in FIG. 1. Server 304 is an example of server 104 in FIG. 1, and server application 314 is an example of server application 105 in FIG. 1. Network 300 is an example of network 102 in FIG. 1.

Client application 306 includes an authentication component 308, a REST API component 310, and a client preferences component 312. Authentication component 308 is configured to perform client side authentication operations such as generating an OTP from a shared secret as described herein. REST API component 310 is configured to perform REST-based message operations, such as between client 302 and server 304, as described herein. Client preferences component 312 is configured to store client preference information associated with a user 322 of client 302 such as a shared secret received from server 304 as described herein.

Server application 314 includes an authentication component 316, a REST API component 318, and a user profiles component 320. Authentication component 316 is configured to perform server side authentication operations such as generating a shared secret, validating a user ID/password combination, and validating a given OTP against a shared secret as described herein. REST API component 318 is configured to perform REST-based message operations, such as between server 304 and client 302, as described herein. User profiles component 320 is configured to store user profile information associated with user 322 of client 302 such as the shared secret generated by authentication component 316 as described herein.

In one embodiment, a process for two step authentication for applications and services that utilize a REST API is provided in which user 322 provides a user ID and password to client application 306 of client 302, and client application 306 transits the user ID and password to server application 314 of server 304. In response to receiving the user ID and password, server application 314 verifies the user ID and password. Upon successful verification of the user ID and password, server application 314 determines whether user 322 is to be upgraded from one step authentication to two step authentication. If user 322 is not to be upgraded from one step authentication to two step authentication, server 304 establishes an authenticated session between client 302 and server 304 having full permissions/access to API operations for client 302. If user 322 is to be upgraded from one step authentication to two step authentication, server 304 establishes an authenticated session between client 302 and server 304 having limited permission with respect to permitted API operations for client 302. Server 304 sends a logon response including the shared secret generated by authentication component 316 to client 302. Client 302 receives the login response including the shared secret and generates a one-time passcode (OTP) based on the shared secret. Client 302 sends an API request including the OTP to server 304 indicating that the shared secret is to be set into a user profile associated with user 322. Server 304 receives the request including the OTP and validates the OTP against the shared secret. If server 304 successfully validates the OTP against the shared secret, server 304 continues the authenticated session between server 304 and client 302 in which client 302 is granted full permissions/access to API operations. Server 304 stores the shared secret within the user profile such that subsequent logons by client application 306 require the user ID, the password, and a current OTP that is generated based upon the shared secret.

Figure 4:
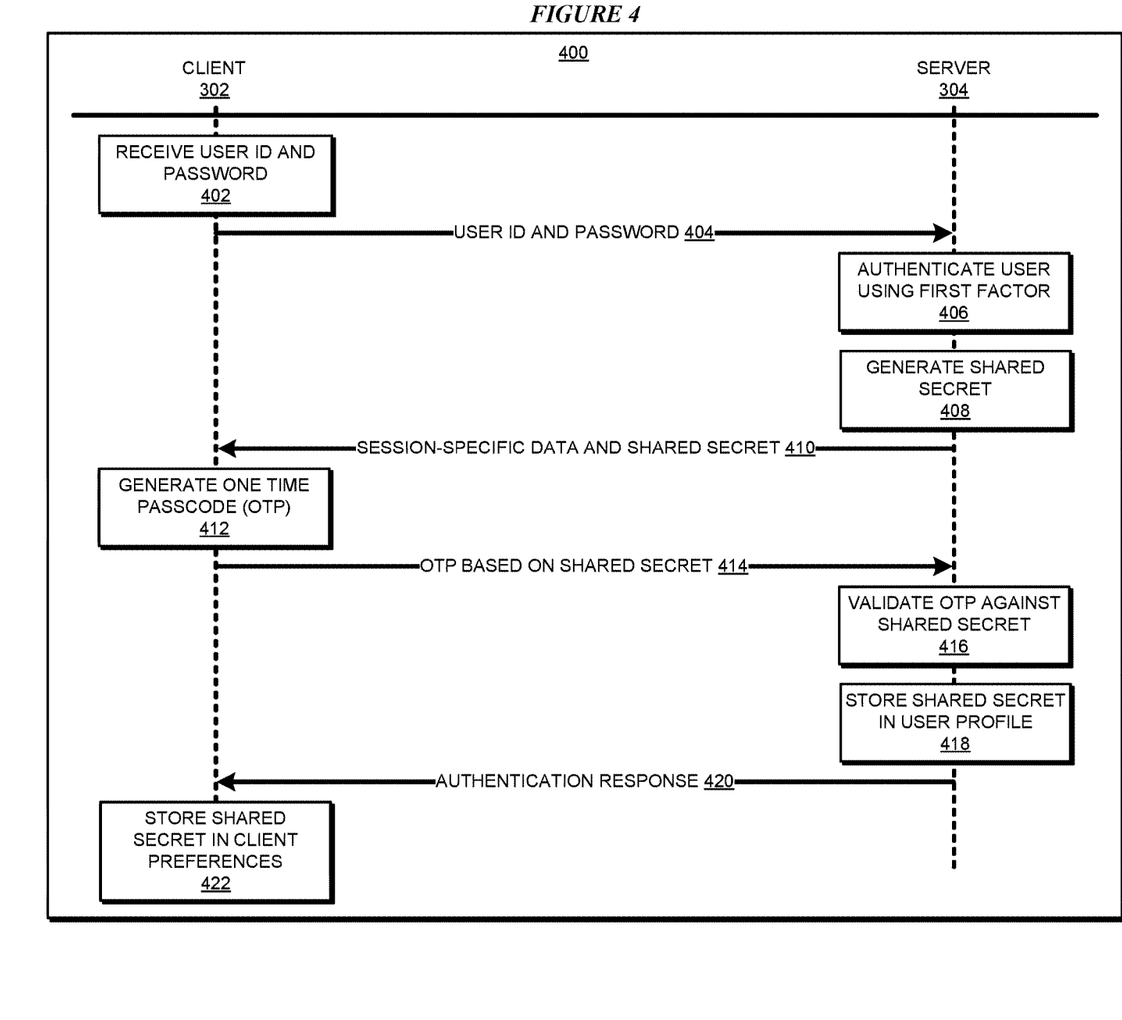
FIG. 4 depicts a message flow of an example process for automatic upgrade of two step authentication in accordance with an illustrative embodiment.

With reference to FIG. 4, this figure depicts a message flow of an example process for automatic upgrade of two step authentication in accordance with an illustrative embodiment. In one or more embodiments, message flow 400 can be implemented in client application 306 and server application 314 of FIG. 3.

In 402, client 302 receives a user ID and password from user 322. In 404, client 302 sends the user ID and password to server 304. In 406, server 304 authenticates user 322 using a first authentication factor by validating the user ID and password. If user 322 is designated as requiring upgrading from one step authentication to two step authentication, in 408 server 304 generates a shared secret and establishes an authenticated session with client 302. In a particular embodiment, the authenticated session has limited permissions/access of API operations for client 302. In 410, server 304 sends session-specific data and the shared secret to client 302 using the authenticated session. In 412, client 302 generates a one time passcode (OTP) based upon the shared secret. In 414, client 302 sends the OTP generated based upon the shared secret to server 304.

In 416, server 304 validates the OTP against the shared secret. If the OTP is validated, in 418 server 304 stores the shared secret in a user profile associated with user 322. In 420, server 304 sends an authentication response to client 302 to continue the authenticated session in which client 302 has full permissions/access to API operations to receive access to applications and/or services provided by server 304 or another server. In 422, client 302 stores the shared secret in client preferences component 312. Message flow 400 ends thereafter. In the embodiment, subsequent logons from user 322 require user 322 to provide the user ID, password, and a current OTP that is generated based on the shared secret in order to be authenticated with server 304 to gain access to applications and services provided by the server.

Figure 5:
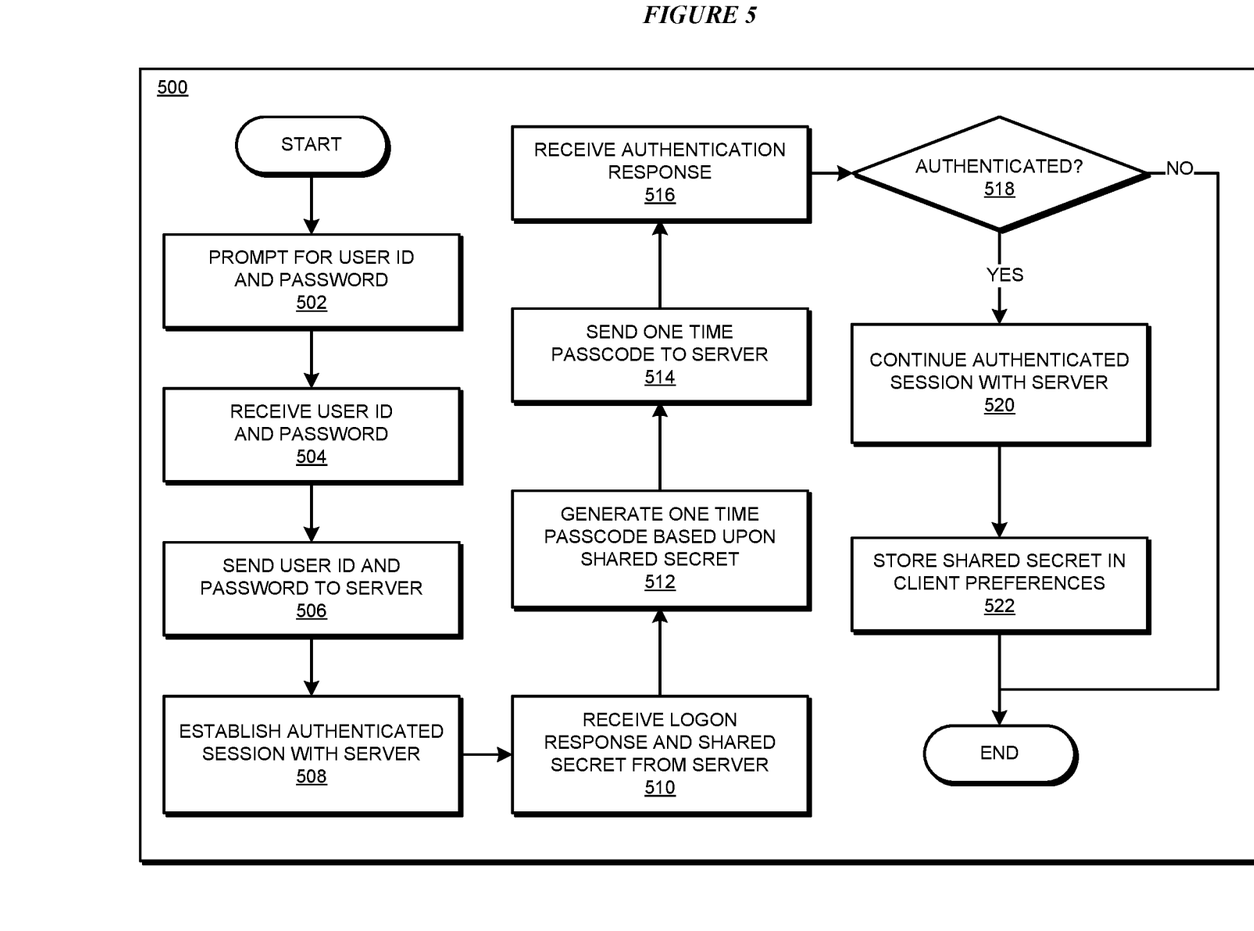
FIG. 5 depicts a flowchart of an example client side process for automatic upgrade of two step authentication in accordance with an illustrative embodiment.

With reference to FIG. 5, this figure depicts a flowchart of an example client side process for automatic upgrade of two step authentication in accordance with an illustrative embodiment. In one or more embodiments, process 500 can be implemented in client application 306 in FIG. 3. In 502, client application 306 prompts user 322 for a user ID and password. In 504, client application 306 receives the user ID and password from user 322. In 506, client application 306 sends the user ID and password to server 304.

If user 322 is designated as requiring upgrading from one step authentication to two step authentication, server 304 generates a shared secret. In block 508, client 302 establishes an authenticated session with server 304. In a particular embodiment, the first authenticated session has limited permissions/access to API operations for client 302. In 510, client 302 receives a logon response including the shared secret from server 304 using the authenticated session.

In 512, client 302 generates a one time passcode (OTP) based upon the shared secret received from server 304. In 514, client 302 sends the OTP generated based upon the shared secret to server 304. Server 304 validates the OTP against the shared secret. If the OTP is validated, server 304 stores the shared secret in a user profile associated with user 322. In 516, client 302 receives an authentication response from server 304. In 518, client 302 determines whether the authentication response indicates that user 322 is authenticated. If user 322 is not authenticated, the process 500 ends. If user 322 is authenticated, in 520 client 302 continues the authenticated session with server 304 in which client 302 is granted full permissions/access to API operations to receive access to applications and/or services provided by server 304 or another server. In 522, client 302 stores the shared secret in client preferences component 312. Client application 306 ends process 500 thereafter. In the embodiment, subsequent logons from user 322 require user 322 to provide the user ID, password, and a current OTP that is generated based on the shared secret in order to be authenticated with server 304 to gain access to applications and services provided by the server.

Figure 6:
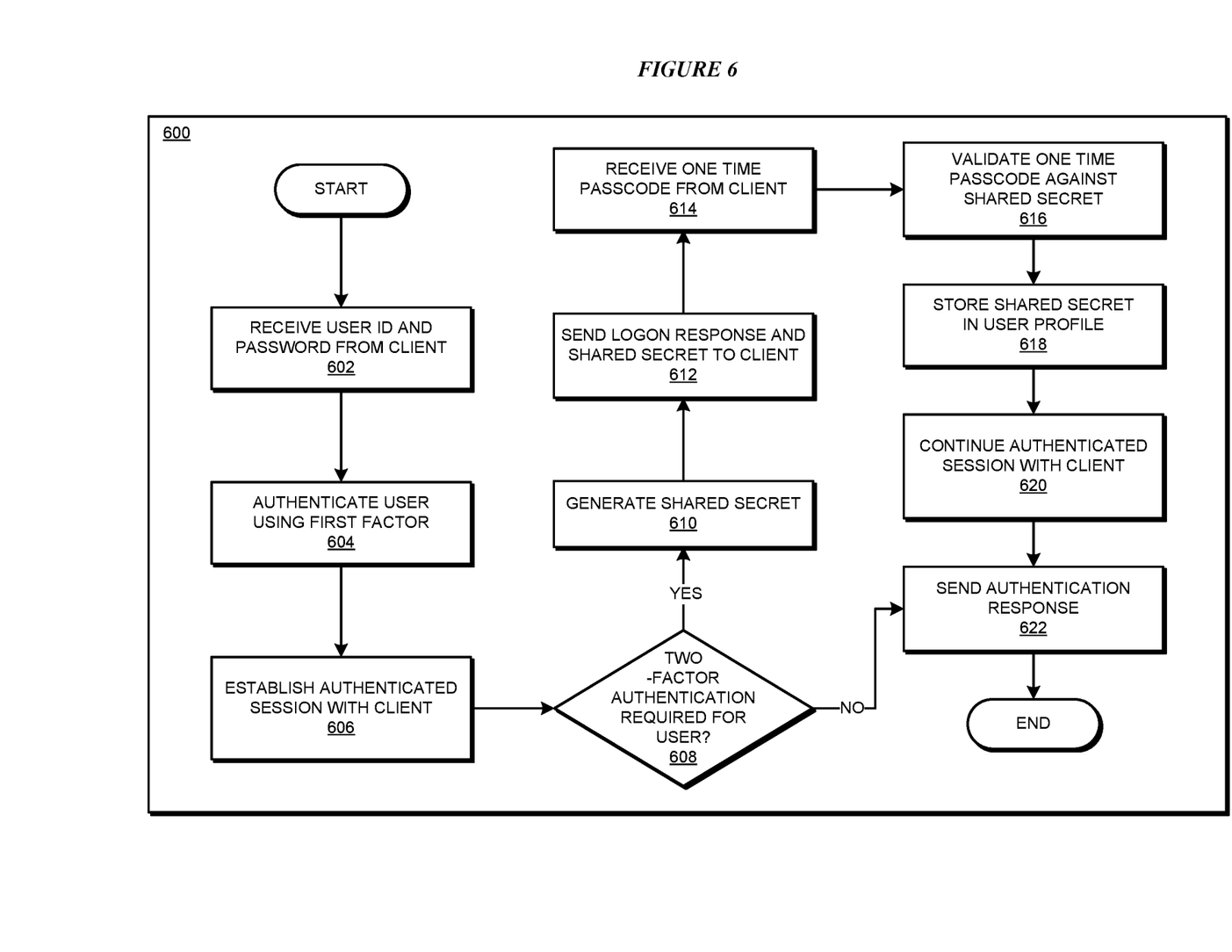
FIG. 6 depicts a flowchart of an example server side process for automatic upgrade of two step authentication in accordance with an illustrative embodiment.

With reference to FIG. 6, this figure depicts a flowchart of an example server side process for automatic upgrade of two step authentication in accordance with an illustrative embodiment. In one or more embodiments, process 600 can be implemented in server application 314 in FIG. 3. In 602, server application 314 of server 304 receives a user ID and password provided by user 322 from client 302.

In 604, server application 314 authenticates user 322 using a first authentication factor by validating the user ID and password. In 606, server application 314 establishes an authenticated session with client 302. In a particular embodiment, the authenticated session has limited permissions/access of API operations for client 302. In 608, server application 314 determines whether upgrading of user 322 from one factor authentication to two factor authentication is required. If user 322 is designated as requiring upgrading from one factor authentication to two factor authentication, in 610 server application 314 generates a shared secret. In 612, server application 314 sends a logon response including the shared secret to client 302 using the authenticated session. In response to receiving the shared secret, client 302 generates a one time passcode (OTP) based upon the shared secret, and sends the OTP generated based upon the shared secret to server 304.

In 614, server application 314 receives the OTP from client 302. In 616, server application 314 validates the OTP against the shared secret. If the OTP is validated, in 618 server application 314 stores the shared secret in a user profile associated with user 322. In 620, server 304 continues the authenticated session in which client 302 is granted full permissions/access to API operations to receive access to applications and/or services provided by server 304 or another server. In 622, server application 314 sends an authentication response to client 302 indicating the continuation of the authenticated session. In the embodiment, subsequent logons from user 322 require user 322 to provide the user ID, password, and a current OTP that is generated based on the shared secret in order to be authenticated with server 304 to gain access to applications and/or services provided by server 304 or another server. If in 608, server application 314 determines that two factor authentication is not required, in 622 server application 314 sends an authentication response to client 302 indicating that the authenticated session may be used by client 302. In such a case in which user 322 is not upgraded to two factor authentication, subsequent logons from user 322 require the providing of only the user ID and password. Server application 314 ends process 600 thereafter.

Thus, a system or apparatus, and computer program product are provided in the illustrative embodiments to enable automatic upgrade of a user from one step authentication to two step authentication and other related features, functions, or operations. Where an embodiment or a portion thereof is described with respect to a type of device, the system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer usable program product comprising one or more computer-readable storage devices, and program instructions stored on at least one of the one or more storage devices, the stored program instructions comprising:
   program instructions to transmit, by a client, a user identifier and a password to a server via an application programming interface (API);
   program instructions to receive, responsive to a verification of the user identifier and password by the server, a logon response and a shared secret,
   wherein the server determines whether the user identifier is to be upgraded from one step authentication to two step authentication after successful verification of the user identifier and the password and grants the client limited permission with respect to permitted API operations and requires the two step authentication for each subsequent logon attempt;
   program instructions to generate, by the client, a one time passcode (OTP) based upon the shared secret;
   program instructions to send the OTP to the server via the API;
   program instructions to grant, responsive to the server validating the OTP against the shared secret, a second set of permissions for operations associated with the API; and
   program instructions to transmit the user ID, the password, and a current OTP generated based upon the shared secret to the server in a subsequent logon operation.

2. The computer usable program product of claim 1, further comprising:
   program instructions to receive, by the client device, the user identifier and password, from a user.

3. The computer usable program product of claim 1, wherein the receiving of the logon response and shared secret is responsive to a determination that a user associated with the user identifier is designated for upgrading from one factor authentication to two factor authentication.

4. The computer usable program product of claim 1, further comprising:
   program instructions to store, by the client, the shared secret within client preferences associated with a user.

5. The computer usable program product of claim 1, wherein the server is configured to store the shared secret within a user profile associated with a user.

6. The computer usable program product of claim 1, wherein the API includes a Representational state transfer (REST) API.

7. The computer usable program product of claim 1, wherein the second set of permissions is greater than the first set of permissions.

8. The computer usable program product of claim 1, wherein the stored program instructions are stored in a computer readable storage device in a data processing system, and wherein the stored program instructions are transferred over a network from a remote data processing system.

9. The computer usable program product of claim 1, wherein the stored program instructions are stored in a computer readable storage device in a server data processing system, and wherein the stored program instructions are downloaded over a network to a remote data processing system for use in a computer readable storage device associated with the remote data processing system.

10. A computer system comprising one or more processors, one or more computer-readable memories, and one or more computer-readable memories, and one or more computer-readable storage devices, and program instructions stored on at least one of the one or more storage devices for execution by at least one of the one or more processors via at least one of the one or more memories, the storage program instructions comprising:
    program instructions to transmit, by a client, a user identifier and a password to a server via an application programming interface (API);
    program instructions to establish an authenticated session with the server, the client having a first set of permissions for operations associated with the API;
    program instructions to receive, responsive to a verification of the user identifier and password by the server, a logon response and a shared secret,
    wherein the server determines whether the user identifier is to be upgraded from one step authentication to two step authentication after successful verification of the user identifier and the password and grants the client limited permission with respect to permitted API operations and requires the two step authentication for each subsequent logon attempt;
    program instructions to generate, by the client, a one time passcode (OTP) based upon the shared secret;
    program instructions to send the OTP to the server via the API;
    program instructions to grant, responsive to the server validating the OTP against the shared secret, a second set of permissions for operations associated with the API; and
    program instructions to transmit the user ID, the password, and a current OTP generated based upon the shared secret to the server in a subsequent logon operation.

11. The computer system of claim 10, wherein the receiving of the logon response and shared secret is responsive to a determination that a user associated with the user identifier is designated for upgrading from one factor authentication to two factor authentication.

12. The computer system of claim 10, further comprising:
    storing, by the client, the shared secret within client preferences associated with a user.

13. The computer system of claim 10, wherein the server is configured to store the shared secret within a user profile associated with a user.

14. The computer system of claim 10, wherein the API includes a Representational state transfer (REST) API.

15. The computer system of claim 10, wherein the second set of permissions is greater than the first set of permissions.

16. The computer system of claim 10, further comprising:
    transmitting at least one member of a set of data, the set of data comprising the user ID, the password, and a current OTP generated based upon the shared secret to the server in a subsequent logon operation.

\* \* \* \* \*